United States Patent

[11] 3,590,593

| [72] | Inventor | Robert G. Miner |
| | | La Crosse, Wis. |
| [21] | Appl. No. | 785,512 |
| [22] | Filed | Dec. 20, 1968 |
| [45] | Patented | July 6, 1971 |
| [73] | Assignee | The Trane Company |
| | | La Crosse, Wis. |

[54] STEAM LIMITING CONTROL FOR STARTUP OF AN ABSORPTION MACHINE
12 Claims, 1 Drawing Fig.

[52] U.S. Cl. .................................................. 62/148, 62/183
[51] Int. Cl. .................................................. F25b 15/00
[50] Field of Search .......................................... 62/148, 183, 497, 141

[56] References Cited
UNITED STATES PATENTS

| 3,195,318 | 7/1965 | Miner | 62/148 |
| 3,265,122 | 8/1966 | Ostrander | 62/183 X |
| 3,321,929 | 5/1967 | Little | 62/183 X |

Primary Examiner—William E. Wayner
Attorneys—Arthur O. Andersen, Lee E. Johnson and Carl M. Lewis ABSTRACT: A novel control system for a two stage generator absorption refrigeration machine limits steam demand by the first stage generator when the absorption machine is started after a period of inactivity. The control system is equally applicable to other energy sources for the first stage generator.

PATENTED JUL-6 1971
3,590,593
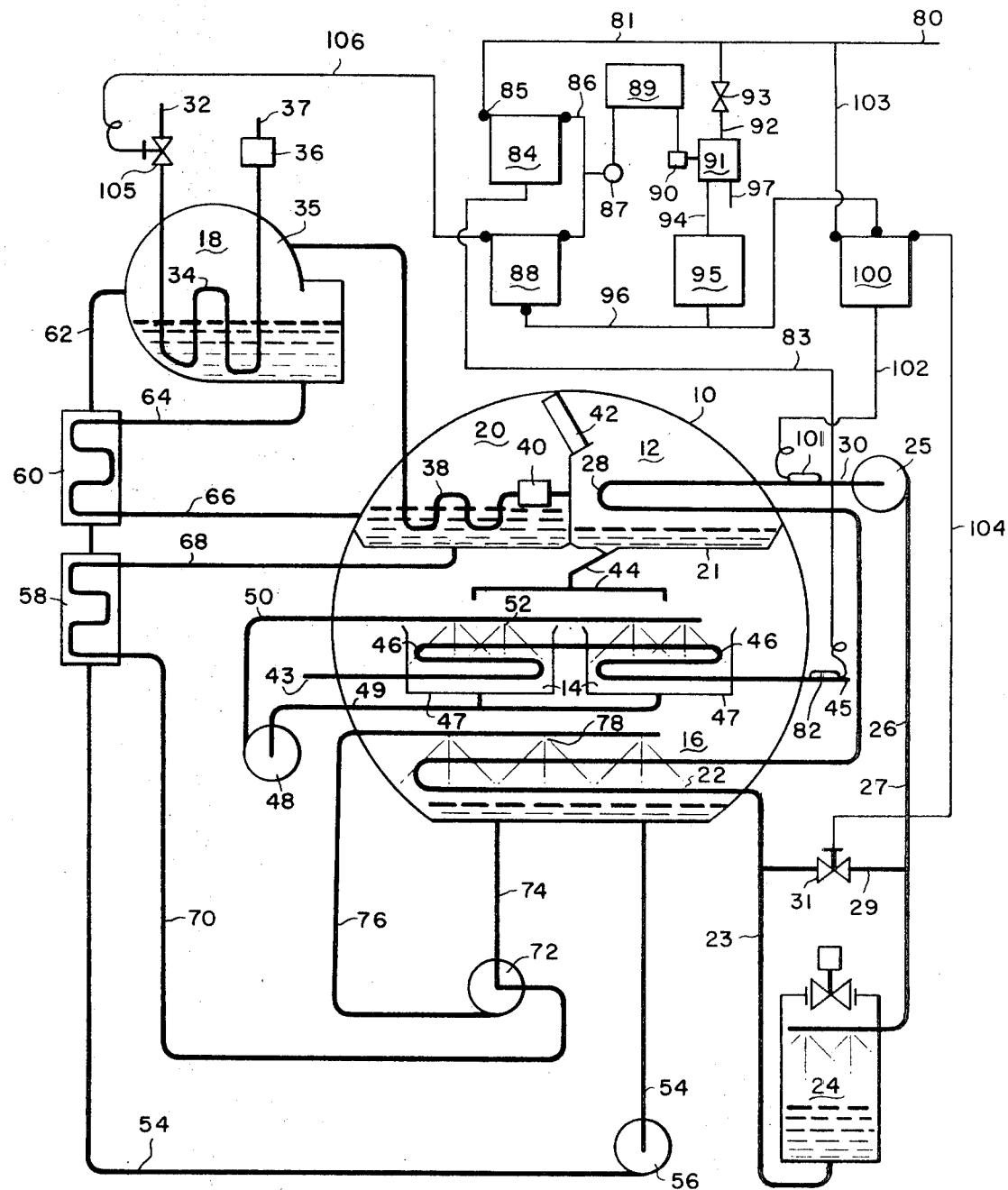
INVENTOR.
ROBERT G. MINER
ATTORNEY

STEAM LIMITING CONTROL FOR STARTUP OF AN ABSORPTION MACHINE

BACKGROUND OF THE INVENTION

1. Field of the Invention

This invention relates to an absorption refrigeration machine having a two stage generator and preferably to a control system for the absorption refrigeration machine which effectively limits input energy to the first stage generator on startup of the machine.

2. Description of the Prior Art

The instant invention is an improvement of and an expansion upon the control system described and claimed in U.S. Pat. No. 3,195,318. With the advent of the two stage generator in an absorption refrigeration machine, it has become necessary to amplify and revise the extent of control systems for single stage machines. It is necessary to better control a two stage machine at startup and at all times throughout the refrigeration producing process because of the higher temperature and pressure differentials between the first stage generator and the rest of the machine than were previously experienced in a single stage machine.

Accordingly, this invention provides a novel control system for limiting steam demand and startup of a two stage absorption refrigeration machine and for controlling the energy input to the first stage generator under varying load conditions occurring during continuous operation of the machine.

SUMMARY OF THE INVENTION

The multistage generator absorption refrigeration machine of the present invention includes an absorber, a condenser, an evaporator, a chilled medium heat exchange means in heat exchange relationship with the evaporator, a high-pressure generator, a low-pressure generator, a first heat exchange means in heat exchange relationship with the high-pressure generator for supplying heated fluid thereto, a second heat exchange means in heat exchange relationship with the absorber, a third heat exchange means in heat exchange relationship with the condenser, a supply conduit adapted to channel cooled heat exchange fluid from a source of cool fluid to the second and third heat exchange means, and a return conduit adapted to channel fluid from the second and third heat exchange means to the source of cooled fluid. The improvement in the above multistage generator absorption refrigeration machine comprises thermostatic activating means responsive to the outlet temperature of the chilled medium, time delay means responsive to the thermostatic activating means, throttling means for increasing the supply of heated fluid to the first heat exchange means upon receipt of a signal, and first control means responsive to the time delay means and the thermostatic activating means for transmitting a signal to the throttling means.

BRIEF DESCRIPTION OF THE DRAWING

The FIGURE schematically illustrates a two stage generator absorption refrigeration machine controlled by the system of the instant invention.

DESCRIPTION OF PREFERRED EMBODIMENTS

The FIGURE schematically illustrates an absorption refrigeration machine enclosed by fluidtight shell 10 containing a condenser 12, two side-by-side evaporators 14, an absorber 16, and a second stage generator 20. The first stage generator 18 is enclosed by a separate fluidtight shell 35.

The absorber 16 contains a heat exchanger 22 supplied with cooling fluid through conduit 23 from a cooling tower 24 to remove heat from the absorber. This cooling fluid is conducted by a conduit 26 to a heat exchanger 28 in the condenser 12. The cooling fluid leaves the condenser through conduit 30 and enters pump 25. Pump 25 returns the cooling fluid from the condenser to the cooling tower 24 through conduit 27. A bypass conduit 29 is provided between conduits 27 and 23 to bypass the cooling tower 24 when the demand for cooling fluid in the absorber and condenser is low. An automatic control responsive valve 31, or any other suitable control responsive throttling means, is provided in circuit with conduit 29.

High-pressure steam flows from a source 32, such as a boiler, to a heat exchanger 34 in the first generator 18. Heat exchanger 34 terminates in restrictor means 36. The restrictor means 36 can be any suitable steam flow restrictor such as an orifice or a float valve. Heat from condensing steam in the heat exchanger 34 causes dilute absorbent solution in the first stage generator to boil. Since restrictor 36 allows substantially no steam to pass from the heat exchanger 34, condensate collects at the restrictor and flows back to the steam source via conduit 37.

Various types of refrigerants and absorbents may be used in the present machine. A solution of lithium bromide absorbent in a refrigerant such as water is satisfactory. Other suitable absorbents and refrigerants may be used if desired. The term "concentrated solution" as used herein means a solution which is concentrated in absorbent. A "dilute solution" is one which is dilute in absorbent. An "intermediate strength solution" refers to a solution having an absorbent concentration between that of a dilute and concentrated solution.

The refrigerant vapor generated in the first stage generator 18 flows through a heat exchanger 38 in the second stage generator 20. A flow regulating device 40 in the form of an orifice, trap, or other suitable regulator, regulates the flow of refrigerant from the heat exchanger 38 to the condenser 12. The heat from condensing refrigerant inside heat exchanger 38 causes the intermediate strength solution in the second stage generator 20 to boil. The vapor passes through a liquid eliminator 42 into the condenser 12 in which the refrigerant has condensed to a liquid by heat exchange with the cooled fluid in heat exchanger 28. The condenser is substantially enclosed by wall 21. The liquid refrigerant flows from the condenser through conduits 44 into the evaporator sections 14.

The refrigerant liquid is evaporated in evaporator section 14, thus removing heat from chilled fluid being circulated through heat exchanger 46. The chilled fluid enters shell 10 through conduit 43 and leaves via conduit 45. Since the absorber section 16 is in vapor communication with the evaporator 14, the absorbent solution can absorb refrigerant vapor from the evaporator and thus remove heat from the evaporator section. Refrigerant liquid dropping from the heat exchanger 46 is collected by pans 47, from which it flows through a conduit 49 to a pump 48 which delivers the refrigerant liquid through conduit 50 to be sprayed in evaporator 14 through nozzles 52.

Solution from the absorber 16 flows through conduit 54, pump 56, low temperature heat exchanger 58, high temperature heat exchanger 60, and conduit 62 to the first stage generator 18 in which it is partially concentrated The partially concentrated solution flows from the first stage generator through conduit 64 to high temperature heat exchanger 60 in which the weak absorbent solution is preheated from heat exchanger 60. The partially concentrated solution flows through conduit 66 to the second stage generator 20 in which it is further concentrated. The concentrated solution from the second stage generator 20 flows through conduit 68 into the low temperature heat exchanger 58 in which it transfers heat to the weak solution flowing in conduit 54. From the low temperature heat exchanger 58, the concentrated solution flows through conduit 70 to pump 72 at which point it mixes with dilute solution flowing from absorber 16 through conduit 74. The mixed solution is forced by pumps 72 through conduit 76 and is discharged into the absorber 16 through nozzles 78. It is to be understood that all pumps are driven by suitable motors which for simplicity have been omitted from the figure.

The preferred control system is supplied from a constant pressure pneumatic source 80 via distribution line 81. The temperature sensing element 82 of thermostat 84 is placed in sensing relationship with chilled water conduit 45. As the chilled water temperature rises to a predetermined level, thermostat 84 is activated. Source energy is supplied to thermostat at 85. Thermostat 84, when activated at its predetermined set point, transmits a signal through line 86. The signal in line 86 is received by a switch means 87 and by relay 88.

The switch means 87 activates in a prearranged sequence all devices in the absorption refrigeration machine necessary for operation, including pump motors and safety devices. These devices are represented by the box 89. Also included in the devices activated by switch 87 is solenoid 90. Solenoid 90 operates valve 91. Valve 91 is connected with source pressure by a line 92 in which restrictor means 93 is placed. Restrictor means 93 can be any suitable gas restrictor such as an orifice. Valve 91 is connected to a capacity tank 95 by line 94. Capacity tank 95 is placed in fluid communication with relay device 88 and with a remotely adjustable thermostat 100 via line 96. When valve 91 is deactivated, line 94 is communicated to line 97 which in turn is vented to the atmosphere. Hence, tank 95 is vented to the atmosphere when valve 91 is deactivated. When valve 91 is activated, line 97 is closed and line 94 communicates with line 92 thus allowing a gradual buildup of air pressure in capacity tank 95 and consequently in line 96. The preferable time delay for the pressure in the capacity tank 95 to rise to source pressure is in the range of 10 to 20 minutes although any other delay suitable to a particular absorption machine design can be utilized.

The temperature sensing element 101 of adjustable thermostat 100 is located in sensing relationship with conduit 30, the outlet from condenser heat exchanger 28. The thermostat 100 is therefore responsive through line 102 to the temperature of cooling water leaving the condenser heat exchanger 28. Thermostat 100 is supplied with source energy through line 103. Thermostat 100 transmits a signal through line 104 which is dependent upon the deviation of the temperature sensed by sensor 101 from a value or set point determined by the signal received from capacity tank 95 through line 96. Valve 31 in cooling tower bypass conduit 29 receives and is responsive to the signal transmitted through line 104.

In the preferred embodiment, valve or throttling means 31 is normally open. As the signal in line 104 increases, that is to say, as the pressure increases, valve 31 begins to close. As the signal in line 104 nears the maximum, valve 31 will be completely closed, thus allowing the entire flow of cooled medium to be directed through the cooling source or cooling tower 24. Additionally, throttling means 105, any suitable steam proportioning valve, is inserted in conduit 32 to regulate the flow of steam into heat exchanger 34. Throttling valve 105 is responsive to and controlled by the signal transmitted through line 106 from the relay device 88.

When the absorption machine has been inoperative for a period of time, the temperature of the chilled medium in conduit 45 will have risen. Normally, when there is a demand for chilled medium, the absorption machine will be started. At start-up the initial steam demand in heat exchanger 34 is very large, often too large for a normal steam source to supply. The control system of the present invention limits the steam input at startup and subsequently controls steam requirements during normal operation of the absorption machine. When the temperature of the chilled water rises, temperature sensor 82 activates thermostat 84. At the predetermined starting temperature, thermostat 84 will relay a signal through line 86, thus activating switch 87 and solenoid 90. During the time that the machine has not been in operation, capacity tank 95 has been communicated with the atmosphere through the action of valve 91. When solenoid 90 is activated, capacity tank 95 is communicated with line 92. Due to restrictor 93, a gradual buildup of pressure in capacity tank is thus begun. Relay 88 will transmit a signal to valve 105 dependent upon the level of signal in line 86. However, relay 88 will transmit a signal no larger than that present in line 96. Thus, the upper limit of the signal in 106 is dependent upon that being transmitted to relay 88 from line 96. Thus, even though the signal from thermostat 84 calls for full steam demand, the gradually increasing signal in 96 will allow only a gradually increasing signal to be transmitted to valve 105. Thus valve 105 opens slowly on startup and allows a gradual buildup of pressure and temperature in generator 18.

Of course, as switch 87 is actuated, the control 89 actuates pump 25 which circulates cooling fluid for the absorber and condenser. In the preferred embodiment the absorber condenser heat exchangers 22 and 28, respectively, are connected in series. Of course, these heat exchangers could be placed in parallel with the supply and return lines from the cooling tower 24. Temperature sensor 101 senses the temperature of the return water to the cooling tower. After the machine has been inactive for a time, the temperature of the condenser water will be low relative to its temperature during operation of the absorption machine. As the temperature of the condenser return water rises, temperature sensor 101 will transmit an increasing signal to thermostat 100. Thermostat 100 will transmit a signal to valve 31, which will cause the valve to begin opening. However, the temperature at which this thermostat controls is determined by the pressure in line 96 containing the gradually rising signal from capacity tank 95.

The effect of this increasing pressure in line 96 is to reset the control point at thermostat 100 gradually downward. Thus, the condensing temperature, which is controlled by the throttling action of valve 31 as determined by thermostat 100, will be gradually lowered from an initial higher setting to its normal value as the system gets under way and the steam demand becomes normal. It is to be noted that operation at higher than normal condensing temperature reduces the capacity of the machine and thus reduces its steam demand. If the cooling fluid modulation provided by valve 31 in conjunction with the adjustable thermostat 100 were not present, a longer time delay would have to be initiated through restrictor 93. Since it is desirable to bring the absorption machine to operating equilibrium as soon as possible, cooling fluid modulation is preferred in conjunction with steam control.

Suitable control components for the remainder of the system are as follows: thermostat 84, Model No. T900—Thermostat manufactured by Johnson Controls of Milwaukee, Wisconsin; relay 88, Model No. C—Cumulator manufactured by Johnson Controls of Milwaukee, Wisconsin; and remotely readjustable thermostat 100, Model No. T901—Submaster Thermostat manufactured by Johnson Controls of Milwaukee, Wisconsin.

During normal operation of the absorption machine, the capacity tank 95 has reached a pressure equal to that of source pressure 80. Thus, thermostat 84 and thermostatic relay device 100 are allowed to operate in their normal manner. As the temperature of chilled medium in conduit 45 varies, the signal transmitted by temperature sensor 82 will cause a varying signal to be transmitted from thermostat 84. This signal will be transmitted directly to valve 105 through line 106. Likewise, as the temperature of the cooling water in conduit 30 varies, the signal transmitted by temperature sensor 101 to thermostatic relay device 100 will cause the proper proportional signal to be transmitted through line 104 to bypass valve 31. During normal operation of the absorption machine when the capacity tank 95 has a pressure equal to that of the source, neither relay devices 88 nor thermostatic relay device 100 allow the signals transmitted through lines 106 and 104 respectively to be dependent upon the signal present in line 96.

It will be understood that, although the preferred control system is actuated by a constant pressure pneumatic source, any other suitable energy source could be utilized for actuating the control components; for example, electrical energy can be utilized. Although the control system has been illustrated and described in conjunction with a two-stage generator absorption machine, its principles are equally applicable to operation of a single stage machine.

The utility of the present invention is apparent. Therefore, what I claim is:

1. In an absorption refrigeration machine including an absorber, a condenser, an evaporator, a chilled medium heat exchange means in heat exchange relationship with said evaporator, a generator, a first heat exchange means in heat exchange relationship with said generator for supplying heated fluid thereto, a second heat exchange means in heat exchange relationship with said absorber, a third heat exchange means in heat exchange relationship with said condenser, a supply conduit adapted to channel cooled heat exchange fluid from a source of cooled fluid to said second and third heat exchange means, and a return conduit adapted to channel fluid from said second and third heat exchange means to the said source of cooled fluid, the improvement comprising a control system including:
   a. time delay means responsive to a condition indicating the need for operation of said control system,
   b. first throttling means for increasing the supply of heated fluid to said first heat exchange means upon receipt of a signal,
   c. first control means responsive to said time delay means for transmitting a signal to said throttling means,
   d. second throttling means in the cooled heat exchange fluid circuit, said circuit comprising said supply and return conduits and said second and third heat exchange means,
   e. second control means thermostatically responsive to the temperature of cooled fluid in said fluid circuit, said second control means additionally responsive to said time delay means, said second control means transmitting a signal to said second throttling means dependent upon said cooled fluid temperature and said time delay means signal.

2. The control system of claim 1 including a thermostatic activating means responsive to the outlet temperature of the chilled medium, said time delay means responsive to said thermostatic activating means.

3. The control system of claim 2 wherein said first control means is also responsive to said thermostatic activating means.

4. The control system of claim 3 wherein said thermostatic activating means activates said time delay means to produce a predetermined changing signal therefrom, said first control means relaying a signal to said first throttling means dependent upon said changing signal, said throttling means responsive to the signal relayed by said first control means to increase the flow of said heated fluid to said heat exchange means.

5. The control system of claim 4 wherein said time delay means operates only when said thermostatic activating means is initially activated by a predetermined temperature of said chilled medium.

6. The control system of claim 5 wherein a variable signal dependent upon temperature of said chilled medium is transmitted to said first control means and thereafter being at least partially relayed by said first control means to said first throttling means, the upper level of said variable signal relayed to said first throttling means being limited by said changing signal received by said first control means from said time delay means.

7. The control system of claim 6 wherein said energy source is a substantially constant pressure pneumatic source.

8. The control system of claim 7 wherein said time delay means comprises a tank means having an output communicating with said control means, a conduit containing a restrictor means communicating said energy source with said tank means, a valve means in said conduit intermediate said restrictor means and said tank means, said valve means capable of opening and closing responsive to said thermostatic activating means, said valve means when closed additionally communicating said tank means with an energy sink at a lower energy level than said energy source.

9. The control system of claim 8 wherein said closed valve means communicates said tank means with the atmosphere.

10. The control system of claim 1 further including:
   a. a bypass conduit placing said supply conduit and said return conduit in fluid communication and bypassing said source of cooled fluid,
   b. second control means thermostatically responsive to the temperature of cooled fluid in said return conduit, said second control means additionally responsive to said time delay means, said second control means transmitting a signal dependent upon said cooled fluid temperature and said time delay means signal,
   c. second throttling means in said bypass conduit responsive to said second control means.

11. In a multistage generator absorption refrigeration machine including an absorber, a condenser, an evaporator, a chilled medium heat exchange means in heat exchange relationship with said evaporator, a high pressure generator, a low pressure generator, a first heat exchange means in heat exchange relationship with said high pressure generator for supplying heated fluid thereto, a second heat exchange means in heat exchange relationship with said absorber, a third heat exchange means in heat exchange relationship with said condenser, a supply conduit adapted to channel cooled heat exchange fluid from a source of cooled fluid to said second and third heat exchange means, and a return conduit adapted to channel fluid from said second and third heat exchange means to the said source of cooled fluid, the improvement comprising:
   a. thermostatic activating means responsive to the outlet temperature of the chilled medium,
   b. time delay means responsive to said thermostatic activating means,
   c. throttling means for increasing the supply of heated fluid to said first heat exchange means upon receipt of a signal,
   d. first control means responsive to said time delay means and said thermostatic activating means for transmitting a signal to said throttling means.
   e. a bypass conduit placing said supply conduit and said return conduit in fluid communication and bypassing said source of cooled fluid,
   f. second control means thermostatically responsive to the temperature of cooled fluid in said return conduit, said second control means additionally responsive to said time delay means, said second control means transmitting a signal dependent upon said cooled fluid temperature and said time delay means signal,
   g. second throttling means in said bypass conduit responsive to said second control means.

12. In a multistage generator absorption refrigeration machine including an absorber, a condenser, an evaporator, a chilled medium heat exchange means in heat exchange relationship with said evaporator, a high pressure generator, a low pressure generator, a first heat exchange means in heat exchange relationship with said high pressure generator for supplying heated fluid thereto, a second heat exchange means in heat exchange relationship with said absorber, a third heat exchange means in heat exchange relationship with said condenser, a supply conduit adapted to channel cooled heat exchange fluid from a source of cooled fluid to said second and third heat exchange means, and a return conduit adapted to channel fluid from said second and third heat exchange means to the said source of cooled fluid, the improvement comprising:
   a. thermostatic activating means responsive to the outlet temperature of the chilled medium,
   b. time delay means responsive to said thermostatic activating means,
   c. throttling means for increasing the supply of heated fluid to said first heat exchange means upon receipt of a signal,
   d. first control means responsive to said time delay means and said thermostatic activating means for transmitting a signal to said throttling means.
   e. throttling means in the cooled heat exchange fluid circuit, said circuit comprising said supply and return conduits and said second and third heat exchange means, f. second control means thermostatically responsive to the temperature of cooled fluid in said fluid circuit, said second control means additionally responsive to said time delay means, said second control means transmitting a signal to said throttling means dependent upon said cooled fluid temperature and said time delay means signal.